US006016458A

United States Patent [19]

[11] Patent Number: 6,016,458

[45] Date of Patent: Jan. 18, 2000

Robinson et al.

[54] VEHICULAR SPEED MANAGEMENT SYSTEM

[76] Inventors: Alan David Robinson, Marshfield, Sewardstone Road Chingford, London, E4 7RF, United Kingdom; William West, 4 Goldings Rise Loughton, Essex, 1G10 2QS, United Kingdom

[21] Appl. No.: 09/137,045

[22] Filed: Aug. 20, 1998

[51] Int. Cl.[7] .................................................... B60K 31/10

[52] U.S. Cl. ............................................ 701/93; 235/492

[58] Field of Search ............................... 701/93, 96, 119; 73/488, 499; 346/18; 116/62.3; 235/492; 345/205; 340/936; 342/70

[56] References Cited

U.S. PATENT DOCUMENTS

| | | | |
|---|---|---|---|
| 5,371,718 | 12/1994 | Ikeda et al. | 367/91 |
| 5,511,435 | 4/1996 | Kitamura et al. | 73/865.9 |
| 5,534,686 | 7/1996 | Kowalski et al. | 235/492 |
| 5,677,695 | 10/1997 | Suzuki et al. | 342/109 |
| 5,731,778 | 3/1998 | Nakatani et al. | 342/70 |
| 5,751,240 | 5/1998 | Fujita et al. | 342/70 |
| 5,757,307 | 5/1998 | Nakatani et al. | 345/70 |
| 5,771,485 | 6/1998 | Echigo . | |
| 5,784,023 | 7/1998 | Bluege | 342/104 |
| 5,847,373 | 12/1998 | Catte | 235/492 |
| 5,905,457 | 5/1999 | Rashid | 342/70 |

*Primary Examiner*—William A. Cuchlinski, Jr.
*Assistant Examiner*—Olga Hernandez

[57] ABSTRACT

A vehicular speed control system is provided including a radio transmitter for transmitting a speed signal indicative of an upper speed limit. Also included is a vehicle having a controller with a first mode of operation for allowing a user to control a speed of a vehicle and a second mode of operation for lowering the speed of the vehicle. The controller operates in the second mode of operation only during the receipt of a disable signal. The vehicle further includes a receiver for receiving the speed signal via free space, a vehicle speed sensor for detecting a current speed of the vehicle, and a comparator for transmitting the disable signal to the controller while the current speed is greater than the upper speed limit received via the speed signal.

9 Claims, 2 Drawing Sheets

VEHICULAR SPEED MANAGEMENT SYSTEM

BACKGROUND OF THE INVENTION

1. Field of the Invention

The present invention relates to vehicle control systems and more particularly pertains to a new vehicular speed management system for controlling the running speed of vehicles.

2. Description of the Prior Art

The use of vehicle control systems is known in the prior art. More specifically, vehicle control systems heretofore devised and utilized are known to consist basically of familiar, expected and obvious structural configurations, notwithstanding the myriad of designs encompassed by the crowded prior art which have been developed for the fulfillment of countless objectives and requirements.

Known prior art vehicle control systems and the like include U.S. Pat. No. 4,334,221; U.S. Pat. No. 4,619,231; U.S. Pat. No. 4,406,175; U.S. Pat. No. Des. 351,828; U.S. Pat. No. 4,291,295; and U.S. Pat. No. 4,245,598 which are each incorporated herein by reference.

In these respects, the vehicular speed management system according to the present invention substantially departs from the conventional concepts and designs of the prior art, and in so doing provides an apparatus primarily developed for the purpose of controlling the running speed of vehicles.

SUMMARY OF THE INVENTION

In view of the foregoing disadvantages inherent in the known types of vehicle control systems now present in the prior art, the present invention provides a new vehicular speed management system construction wherein the same can be utilized for controlling the running speed of vehicles.

The general purpose of the present invention, which will be described subsequently in greater detail, is to provide a new vehicular speed management system apparatus and method which has many of the advantages of the vehicle control systems mentioned heretofore and many novel features that result in a new vehicular speed management system which is not anticipated, rendered obvious, suggested, or even implied by any of the prior art vehicle control systems, either alone or in any combination thereof.

To attain this, the present invention generally comprises a radar gun with a speed detection mechanism and a display for depicting a speed of a vehicle, as is conventional in the art. The radar gun further includes a radio transmitter for transmitting a speed signal via free space that is representative of a user selected upper speed limit. As shown in FIG. 2, a speed limit sign is mounted on a post with speed limit indicia printed thereon. The speed limit sign further includes a transmitter powered by at least one solar cell. It should be noted that the transmitter of the speed limit sign is adapted to continuously transmit a speed signal that is indicative of an upper speed limit that corresponds to the speed limit indicia. With reference now to FIG. 4, a vehicle is provided including an acceleration control mechanism. The acceleration control mechanism has a first mode of operation for allowing a user to control a speed of a vehicle. Further, the acceleration control mechanism is equipped with a second mode of operation for unconditionally imparting a low predetermined speed on the vehicle. In use, the acceleration control mechanism operates in the second mode of operation only during the receipt of a disable signal. The vehicle further includes a receiver for receiving the speed signal via free space, a vehicle speed sensor for detecting a current speed of the vehicle and a storage medium for storing a maximum override speed. Note FIG. 4. Connected to the foregoing components is a comparator having a first mode of operation upon the lack of depression of an override button mounted on a dash of the vehicle. In the first mode, the comparator is adapted for transmitting the disable signal to the acceleration control mechanism while the current speed is greater than the upper speed limit received via the speed signal. It should be understood that the disable signal is transmitted only during the receipt of the speed signal via free space. The comparator further has a second mode of operation for only a predetermined amount of time upon the instantaneous depression of an override button. During the second mode of operation, the comparator is adapted for transmitting the disable signal to the acceleration control mechanism upon the current speed being greater than the maximum override speed stored in the storage medium.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new vehicular speed management system apparatus and method which has many of the advantages of the vehicle control systems mentioned heretofore and many novel features that result in a new vehicular speed mnanagement system which is not anticipated, rendered obvious, suggested, or even implied by any of the prior art vehicle control systems, either alone or in any combination thereof.

It is another object of the present invention to provide a new vehicular speed management system which may be easily and efficiently manufactured and marketed.

It is a further object of the present invention to provide a new vehicular speed management system which is of a durable and reliable construction.

An even further object of the present invention is to provide a new vehicular speed management system which is susceptible of a low cost of manufacture with regard to both materials and labor, and which accordingly is then susceptible of low prices of sale to the consuming public, thereby making such vehicular speed management system economically available to the buying public.

Still yet another object of the present invention is to provide a new vehicular speed management system which provides in the apparatuses and methods of the prior art some of the advantages thereof, while simultaneously overcoming some of the disadvantages normally associated therewith.

Still another object of the present invention is to provide a new vehicular speed management system for controlling the running speed of vehicles.

Even still another object of the present invention is to provide a new vehicular speed management system that includes a radio transmitter for transmitting a speed signal indicative of an upper speed limit. Also included is a vehicle having a controller with a first mode of operation for allowing a user to control a speed of a vehicle and a second mode of operation for lowering the speed of the vehicle. The controller operates in the second mode of operation only during the receipt of a disable signal. The vehicle further includes a receiver for receiving the speed signal via free space, a vehicle speed sensor for detecting a current speed of the vehicle, and a comparator for transmitting the disable signal to the controller while the current speed is greater than the upper speed limit received via the speed signal.

These together with other objects of the invention, along with the various features of novelty which characterize the invention, are pointed out with particularity in the claims annexed to and forming a part of this disclosure. For a better understandings of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
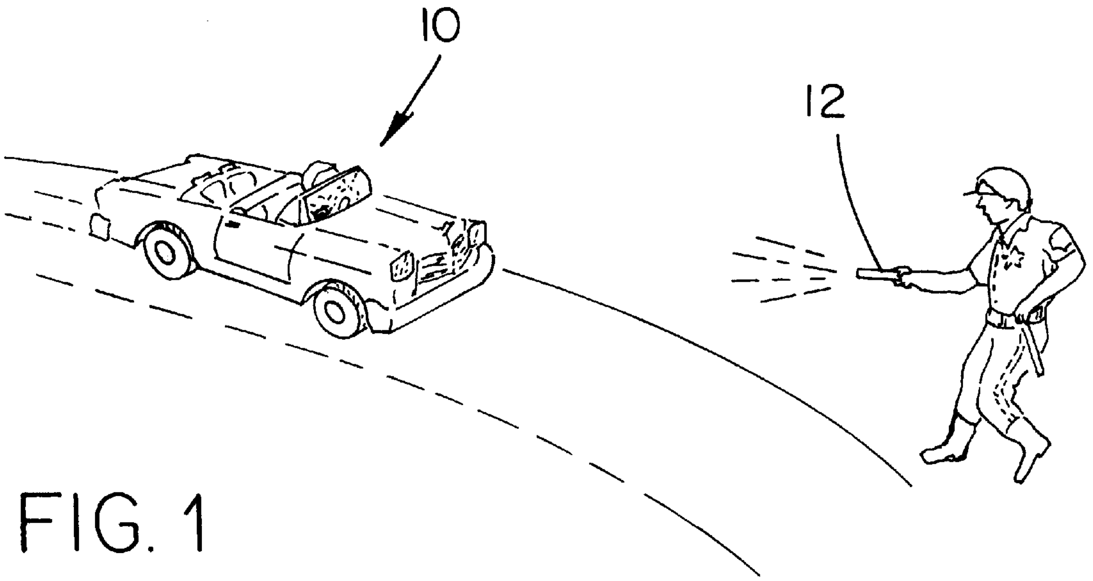
FIG. 1 is a perspective view of the radar gun of the present invention.

With reference now to the drawings, and in particular to FIGS. 1 through 4 thereof, a new vehicular speed management system embodying the principles and concepts of the present invention and generally designated by the reference numeral 10 will be described.

The present invention, designated as numeral 10, includes a radar gun 12 with a speed detection mechanism and a display for depicting a speed of a vehicle, as is conventional in the art. The radar gun further includes a radio transmitter 14 for transmitting a speed signal via free space that is representative of a user selected upper speed limit.

Figure 2:
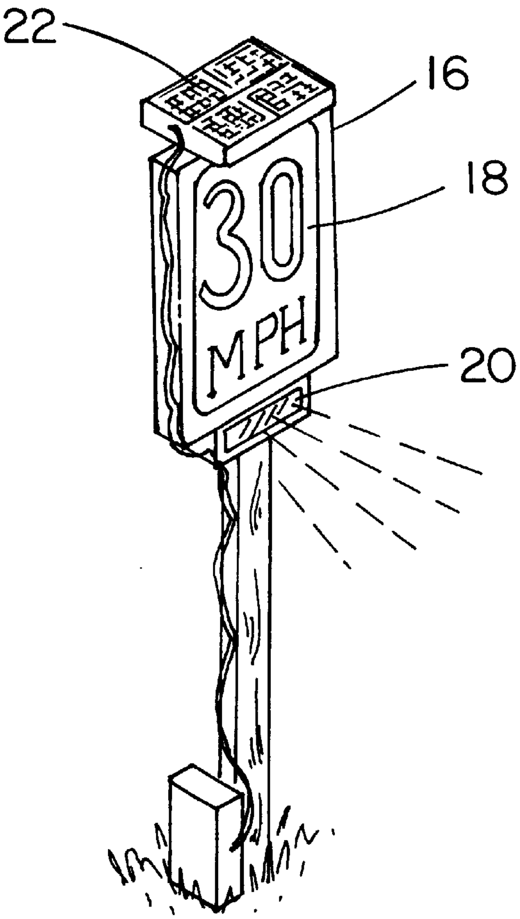
FIG. 2 is a perspective view of the speed limit sign of the present invention.
Figure 3:
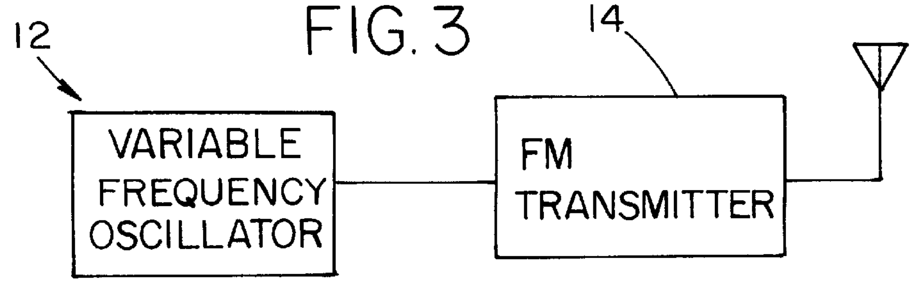
FIG. 3 is a schematic diagram of the radar gun of the present invention.

As shown in FIG. 2, a speed limit sign 16 is mounted on a post with speed limit indicia 18 printed thereon. The speed limit sign further includes a transmitter 20 powered by at least one solar cell 22. As an option, additional power may be supplied via a battery or a main electrical line. It should be noted that the transmitter of the speed limit sign is adapted to continuously transmit a speed signal that is indicative of an upper speed limit that corresponds to the speed limit indicia.

Figure 4:
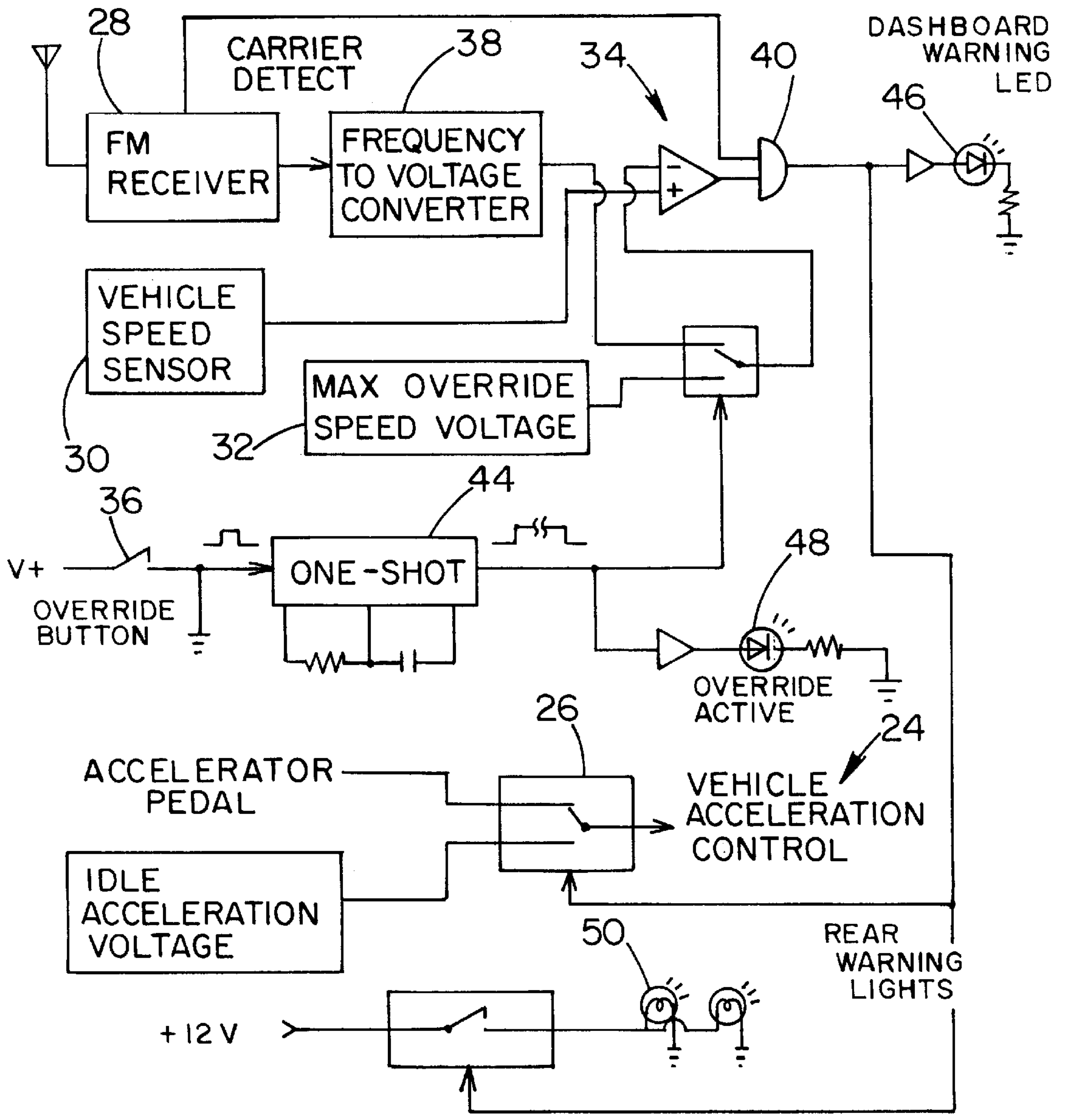
FIG. 4 is a schematic diagram of the various components of the vehicle of the present invention.

With reference now to FIG. 4, a plurality of vehicles are provided each with an acceleration control mechanism 24. The acceleration control mechanism has a first mode of operation for allowing a user to control a speed of a vehicle. Further, the acceleration control mechanism is equipped with a second mode of operation for unconditionally imparting a low predetermined speed on the vehicle. Such low predetermined speed is preferably an idle speed of about 5–30 miles an hour. In use, the acceleration control mechanism operates in the second mode of operation only during the receipt of a disable signal. To accomplish this, the accelerator control mechanism may be connected to an idle accelerator voltage generator and a pedal controlled voltage generator with a voltage controlled switch 26 connected therebetween.

The vehicle further includes a receiver 28 for receiving the speed signal via free space, a vehicle speed sensor 30 for detecting a current speed of the vehicle and a storage medium 32 for storing a maximum override speed in the form of a constant voltage. Note FIG. 4. Connected to the foregoing components is a comparator 34 having a first mode of operation upon the lack of depression of an override button 36 mounted on a dash of the vehicle. In the first mode, the comparator is adapted for transmitting the disable signal to the acceleration control mechanism while the current speed is greater than the upper speed limit received via the speed signal.

To accomplish this, the speed signal preferably has a frequency that is a function of the upper speed limit. Further, the receiver may be connected to a frequency-to-voltage converter 38 for affording a voltage that corresponds to the frequency received. It is this voltage that is fed to the comparator.

It should be understood that the speed signal may be received via the radar gun or the speed sign. Further, the disable signal is transmitted only during the receipt of the speed signal via free space and the speed of the vehicle exceeding the upper speed limit. Ideally, a code that is transmitted by the transmitters and is detected by the receiver. With the use of the AND gate 40 of FIG. 4, the disable signal is transmitted to the acceleration control mechanism only if the code is detected. During operation of the comparator in the first mode of operation, the present invention slows the vehicle to the upper speed limit whenever the speed of the vehicle exceeds an amount indicated by the specially eqiupped radar or speed limit sign.

The comparator further has a second mode of operation for only a predetermined amount of time upon the instantaneous depression of an override button. Such predetermined amount of time is governed by a one-shot multivibrator 44, as shown in FIG. 4. During the second mode of operation, the comparator is adapted for transmitting the disable signal to the acceleration control mechanism upon the current speed being greater than the maximum override speed stored in the storage medium, not the upper speed limit of the speed signal. In other words, in the second mode of operation, the comparator operates as before but instead compares the current speed with a maximum predetermined override speed. This allows a user to escape in the case of a car-jacking or the like.

Finally, for indicating purposes, the vehicle further includes a warning lamp 46 mounted on a dash of the vehicle and connected to the comparator for illuminating during the receipt of the disable signal. Also mounted on the dash is an override lamp 48 that is connected to the override button for illuminating for the predetermined amount of time upon the depression of the override button. Lastly, rear warning lights 50 are mounted on a rear of the vehicle and connected to the comparator for illuminating during the receipt of the disable signal.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the part, of invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A vehicular speed control system comprising, in combination:

a radar gun with a speed detection mechanism and a display for depicting a speed of a vehicle at which the speed detection mechanism is directed, the radar gun further including a radio transmitter for transmitting a speed signal indicative of a user selected upper speed limit;

a speed limit sign mounted on a post with speed limit indicia printed thereon, the speed limit sign further including a transmitter powered by at least one solar cell, wherein the transmitter of the speed limit sign is adapted to continuously transmit a speed signal that is indicative of an upper speed limit that corresponds to the speed limit indicia; and a vehicle including an acceleration control mechanism having a first mode of operation for allowing a user to control a speed of a vehicle and a second mode of operation for unconditionally imparting a low predetermined speed on the vehicle, wherein the acceleration control mechanism operates in the second mode of operation only during the receipt of a disable signal, the vehicle further including a receiver for receiving the speed signal via free space, a vehicle speed sensor for detecting a current speed of the vehicle, a storage medium for storing a maximum override speed, and a comparator having a first mode of operation upon the lack of depression of an override button for transmitting the disable signal to the acceleration control mechanism while the current speed is greater than the upper speed limit received via the speed signal, the comparator further having a second mode of operation for only a predetermined amount of time upon the instantaneous depression of an override button during which the comparator is adapted for transmitting the disable signal to the acceleration control mechanism upon the current speed being greater than the maximum override speed stored in the storage medium;

said vehicle further including a warning lamp mounted on a dash of the vehicle and connected to the comparator for illuminating during the receipt of the disable signal, an override lamp mounted on the dash of the vehicle and connected to the override button for illuminating for the predetermined amount of time upon the depression of the override button, and rear warning lights mounted on a rear of the vehicle and connected to the comparator for illuminating during the receipt of the disable signal.

2. A vehicular speed control system comprising:

a radio transmitter for transmitting a speed signal indicative of an upper speed limit; and a vehicle including a controller having a first mode of operation for allowing a user to control a speed of a vehicle and a second mode of operation for lowering the speed of the vehicle, wherein the controller operates in the second mode of operation only during the receipt of a disable signal, the vehicle further including a receiver for receiving the speed signal via free space, a vehicle speed sensor for detecting a current speed of the vehicle, and a comparator for transmitting the disable signal to the controller while the current speed is greater than the upper speed limit received via the speed signal.

3. A vehicular speed control system as set forth in claim 2 wherein the vehicle further includes a warning lamp mounted on a dash of the vehicle and connected to the comparator for illuminating during the receipt of the disable signal.

4. A vehicular speed control system as set forth in claim 2 wherein the vehicle further includes at least one rear warning light mounted on a rear of the vehicle and connected to the comparator for illuminating during the receipt of the disable signal.

5. A vehicular speed control system as set forth in claim 2 wherein the transmitter is mounted on a radar and the upper speed limit is user-selected.

6. A vehicular speed control system as set forth in claim 2 wherein the transmitter is mounted on a speed limit sign with speed limit indicia printed thereon, the transmitter of the speed limit sign being adapted to continuously transmit the speed signal that is indicative of the upper speed limit which corresponds to the speed limit indicia.

7. A vehicular speed control system as set forth in claim 2 wherein the vehicle further includes a storage medium for storing a maximum override speed and the comparator has a second mode of operation upon the depression of an override button during which the comparator is adapted for transmitting the disable signal to the controller upon the current speed being greater than the maximum override speed stored in the storage medium.

8. A vehicular speed control system as set forth in claim 7 wherein the comparator operates in the second mode for only a predetermined amount of time upon the depression of the override button.

9. A vehicular speed control system as set forth in claim 7 wherein the vehicle further includes an override lamp mounted on the dash of the vehicle and connected to the override button for illuminating upon the depression of the override button.

* * * * *